April 22, 1941.  L. V. BLACK ET AL  2,239,546
PROCESS AND APPARATUS FOR BENDING GLASS SHEETS
Filed March 30, 1938  8 Sheets-Sheet 1

INVENTORS
LLOYD V. BLACK AND
GERALD Z. MINTON
BY Bradley & Bee
ATTORNEYS.

April 22, 1941.  L. V. BLACK ET AL  2,239,546
PROCESS AND APPARATUS FOR BENDING GLASS SHEETS
Filed March 30, 1938  8 Sheets-Sheet 3

INVENTORS
LLOYD V. BLACK AND
GERALD Z. MINTON
BY Bradley & Bee
ATTORNEYS.

April 22, 1941.  L. V. BLACK ET AL  2,239,546
PROCESS AND APPARATUS FOR BENDING GLASS SHEETS
Filed March 30, 1938  8 Sheets-Sheet 7

INVENTORS
LLOYD V. BLACK AND
GERALD Z. MINTON
BY Bradley & Bee
ATTORNEYS.

April 22, 1941.  L. V. BLACK ET AL  2,239,546
PROCESS AND APPARATUS FOR BENDING GLASS SHEETS
Filed March 30, 1938  8 Sheets-Sheet 8

INVENTORS
LLOYD V. BLACK AND
GERALD Z. MINTON
BY Bradley & Lee
ATTORNEYS.

Patented Apr. 22, 1941

2,239,546

UNITED STATES PATENT OFFICE 2,239,546

PROCESS AND APPARATUS FOR BENDING GLASS SHEETS

Lloyd V. Black and Gerald Z. Minton, Tarentum, Pa., assignors to Pittsburgh Plate Glass Company, a corporation of Pennsylvania Application March 30, 1938, Serial No. 198,870

14 Claims. (Cl. 49—7)

The invention relates to a process and apparatus for bending glass sheets, and has for the principal objects the provision of an improved process and apparatus, which will bend the sheets without marring them and without danger of breakage. A further object is the provision of apparatus of cheap simple character which is easily handled and readily subject to adjustment for producing a wide range of bends in sheets of all sizes within the capacity of the apparatus. A still further object is the provision of apparatus in which the area of contact of the bending members with the sheet is very small, so that such members offer little interference with the uniform cooling of the sheet in the subsequent treatment thereof, such as in annealing the sheet or in subjecting it to other cooling treatment; thus permitting the desired reduction in temperature more quickly and with less liability of fracture than would otherwise be the case.

In carrying out the process, the sheet to be bent is supported in vertical position, in such manner that it is free to move to the desired curvature under the action of the bending devices, which are preferably, although not necessarily, wires so positioned and tensioned that they apply yielding pressure tending to bend the sheet to the desired curvature. When the sheet is heated to the softening point, the pressure of the wires becomes automatically effective to bend the sheet to the desired contour. The wires are preferably applied in pairs, with one member of each pair on one side of the sheet and the other member of each pair on the other side, but if desired, the wires may all be on one side of the sheet with a fixed templet on the other side, the wires serving to bend the sheet against the templet which thus positively governs the amount of bending movement. In the first form of apparatus, the sheet is preferably hung from its upper edge and the bending wires are arranged vertically, while in the second form, the sheet is supported on its lower edge and the wires are preferably arranged horizontally.

The process is illustrated as applied to the bending of single sheets of glass, but in case the sheets are to be used in making safety glass, which requires two sheets of a curvature such that they will fit each other when nested together to form a laminated plate, the process may be applied to the bending of two sheets at one time, the two sheets being placed face to face with their edges matching, so that they are bent simultaneously. Certain embodiments of the apparatus are shown in the accompanying drawings, wherein:

Figures 1, 3:
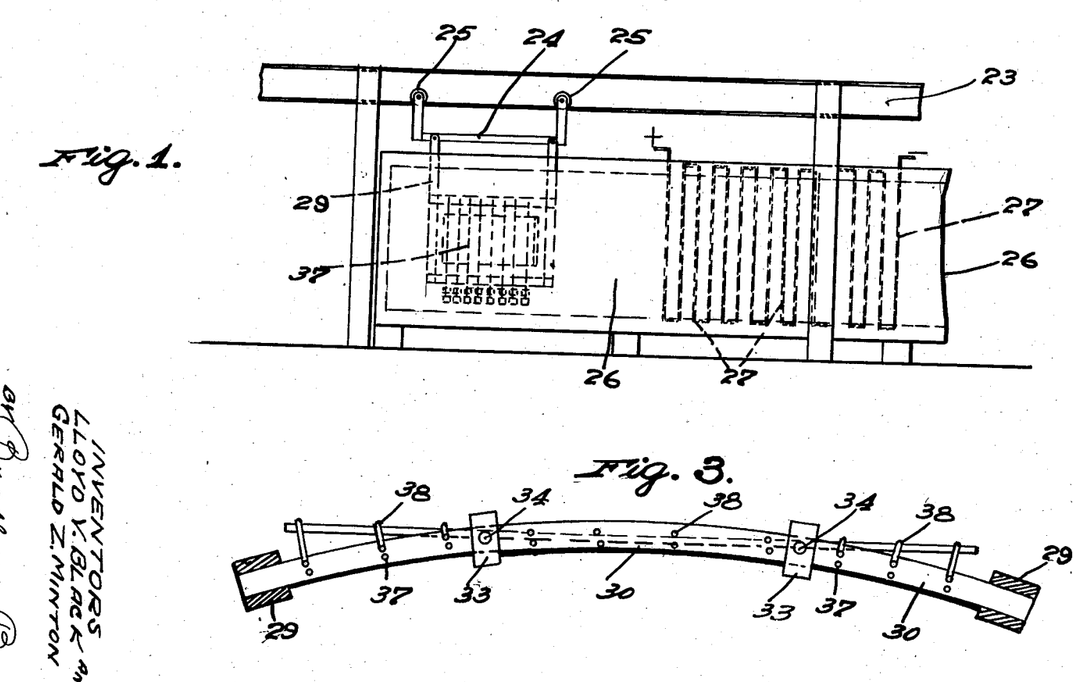
Figure 1 is a side elevation of the complete apparatus in connection with the heating means.
Fig. 3 is a horizontal section on the line III—III of Fig. 2.
Figure 2:
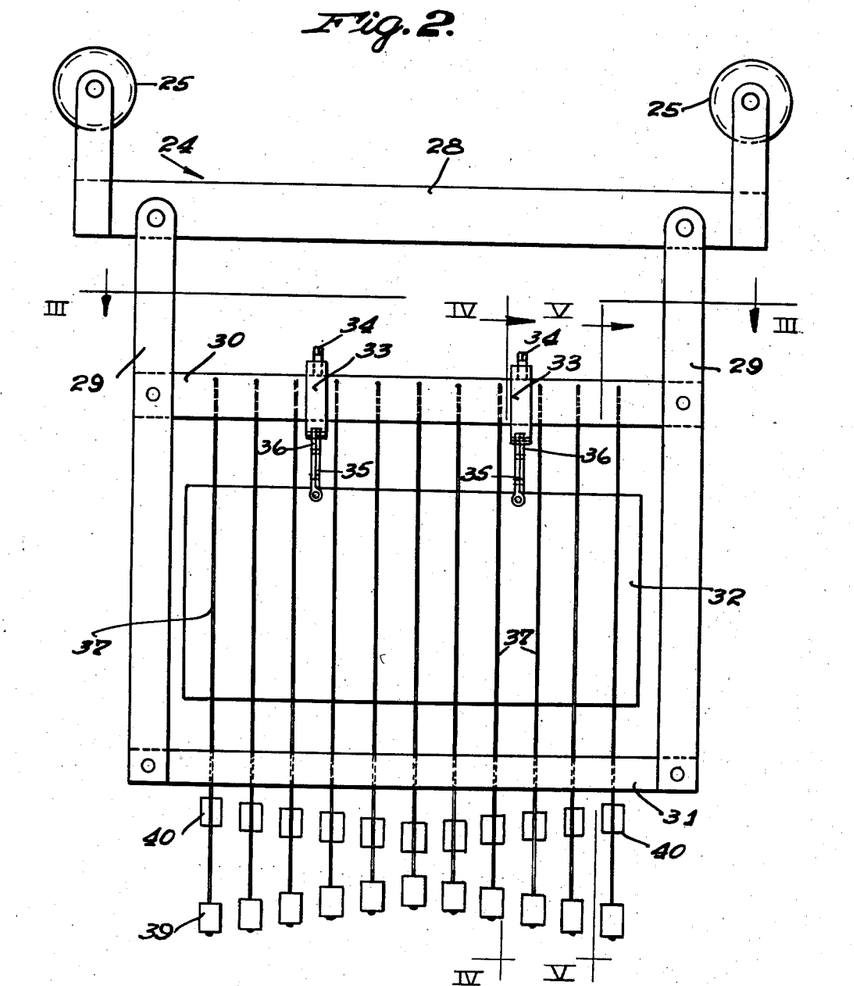
Fig. 2 is a side elevation of the portion of the apparatus to which the invention particularly relates.

Referring to the drawings, the general arrangement as shown in Fig. 1 involves the use of an overhead rail 23 and the carrier 24 provided with the wheels 25 riding upon the flanges of the rail 23 and adapted to carry the glass sheet into the furnace in which it is heated to the softening temperature preliminary to bending. The furnace comprises a casing 26 adapted to surround the carrier and provided with suitable heating means for bringing the glass to the softening temperature as it progresses through the furnace, this being a type of furnace well known in the art. The heating may be accomplished in any suitable manner the means shown being electrical resistance elements 27 arranged in parallel in the side walls of the casing and having a suitable current supply. The glass sheet is heated to the softening point in this portion of the apparatus and is then carried forward through the furnace to anneal it or to cool it, depending on the character of the product which it is desired to produce. If the sheet is to be annealed, the temperature of the furnace gradually decreases through the critical annealing range and finally reaches a point at the outlet end, where the glass has a temperature to permit it to be safely removed from the furnace when annealed.

The portion of the apparatus to which the invention particularly relates is shown in Figs. 2 to 5, wherein 28 is the supporting bar which carries the wheels 25 and from which a frame is hung comprising the side bars 29, 29, the curved top bar 30 and the similarly curved bottom bar 31. The glass sheet 32 is supported in the frame from two collars 33 clamped in position by means of the set screws 34, such collars carrying the tongs 35 whose upper ends are connected to the collar by the links 36 so that the weight of the sheet insures a proper gripping action of the points of the tong upon the glass. These tong supports are applied at positions along the upper edge such that in the bending operation, these points of support do not depart during the bending operation from the vertical plane in which they are originally applied.

The bending of the glass sheet when it reaches the softening point at which it will bend without marring, is accomplished by means of two sets of wires 37, 38, the wires 37 lying on one side of the sheet, and the wires 38 on the other side. These wires extend at their upper ends through two sets of perforations in the bar 30 which sets are spaced apart approximately the thickness of the glass sheet 32. At their lower ends these wires extend through similar holes in the bottom bar 31 and are provided with the weights 39 and 40. As indicated in Fig. 3, the bars 30 and 31 are curved to correspond with the curvature which it is desired to produce in the glass sheet 32, so that when the plate is positioned between the two sets of wires, they tend to bend it to the contour of the bars 30 and 31. Any bending of the plate is, of course, resisted by the stiffness of the plate when it is cold, but when it is heated to the softening point, it is bent so that it corresponds to the curvature of the bars 30 and 31. A part of the wires, such as 38 (Fig. 5) tend to bend the plate, while another part thereof merely acts to limit or determine the bending movement of the glass. Some of the wires on each side of the plate, however, apply bending pressure to the sheet and the two sets together give the desired curvature when the glass is softened to the proper degree. In practice, this procedure operates to give the necessary bending effect without marring the glass since the bending temperature is below the marring temperature. After the glass has been bent, it sets in this bending position as the carrier moves along the heating kiln to a position of lower temperature. It will be noted that the amount of force required to bend the sheet is relatively slight, since the sheet is so supported that it is perfectly free to move in arriving at the curvature as dictated by the position of the wires.

While the wires are preferably tensioned by means of weights, it is possible to accomplish the same tensioning function by the use of springs and this construction is illustrated in Figs. 6 to 10, wherein the pairs of wires 41 and 42 are fixed at their lower ends with respect to the bottom bar 43 and are tensioned at their upper ends by means of the springs 44 which are attached to the bar 45. In this construction the side bars of the frame comprise the pairs of parallel members 46 connected at their upper and lower ends by the looped portions 47 and 48.

The positions of the pair of wires is in this case determined by the position of the brackets 49 and 50 carried by the cross bars 51 and 43. The brackets 49 and 50 are mounted on screws 52 and 53, which extend transversely of the bars 51 and 43 and are welded thereto at their ends. The position of the brackets longitudinally of the screws is determined by the nuts 54 mounted on the screws on either side of the brackets. The brackets 49 are provided at their lower edges with flanges 55 (Figs. 8 and 9) and the pairs of wires 41 and 42 extend through the perforations 56 in these flanges. Similarly, the brackets 50 are provided at their upper ends with flanges 57 having pairs of perforations through which the lower ends of the wires extend and are secured. The brackets 49 and 50 may be adjusted on the screws 52 and 53 so that the pairs of wires lie in different planes and thus tend to bend the glass sheet 58 to the desired curvature when it is heated to the softening point. The advantage involved in the use of the brackets, as compared with the construction of Figs. 1 to 5, is that the use of the brackets permits the wires to be adjusted in a wide variety of ways so that different curvatures may be produced on the apparatus depending upon the requirements. As indicated in Fig. 7, the springs 44 lie outside the upper wall of the furnace, the slot being made tight by the flexible asbestos seals 58a.

Figures 4, 5:
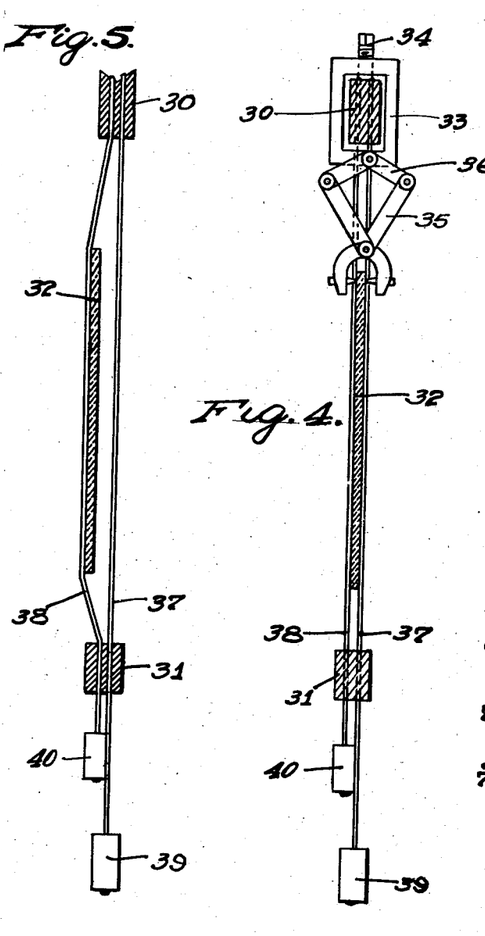
Figs. 4 and 5 are vertical sections on the lines IV—IV and V—V respectively of Fig. 2.
Figure 6:
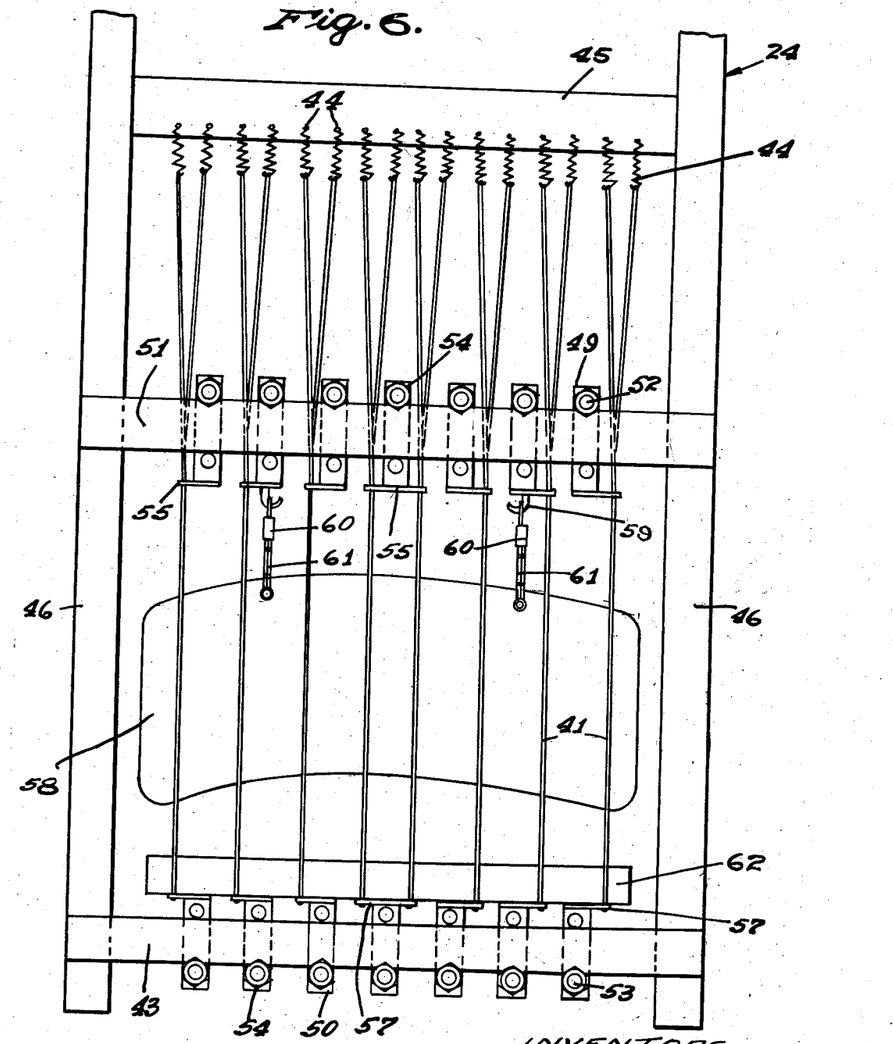
Fig. 6 is a side elevation of a modified construction.
Figures 7, 8, 9, 10:
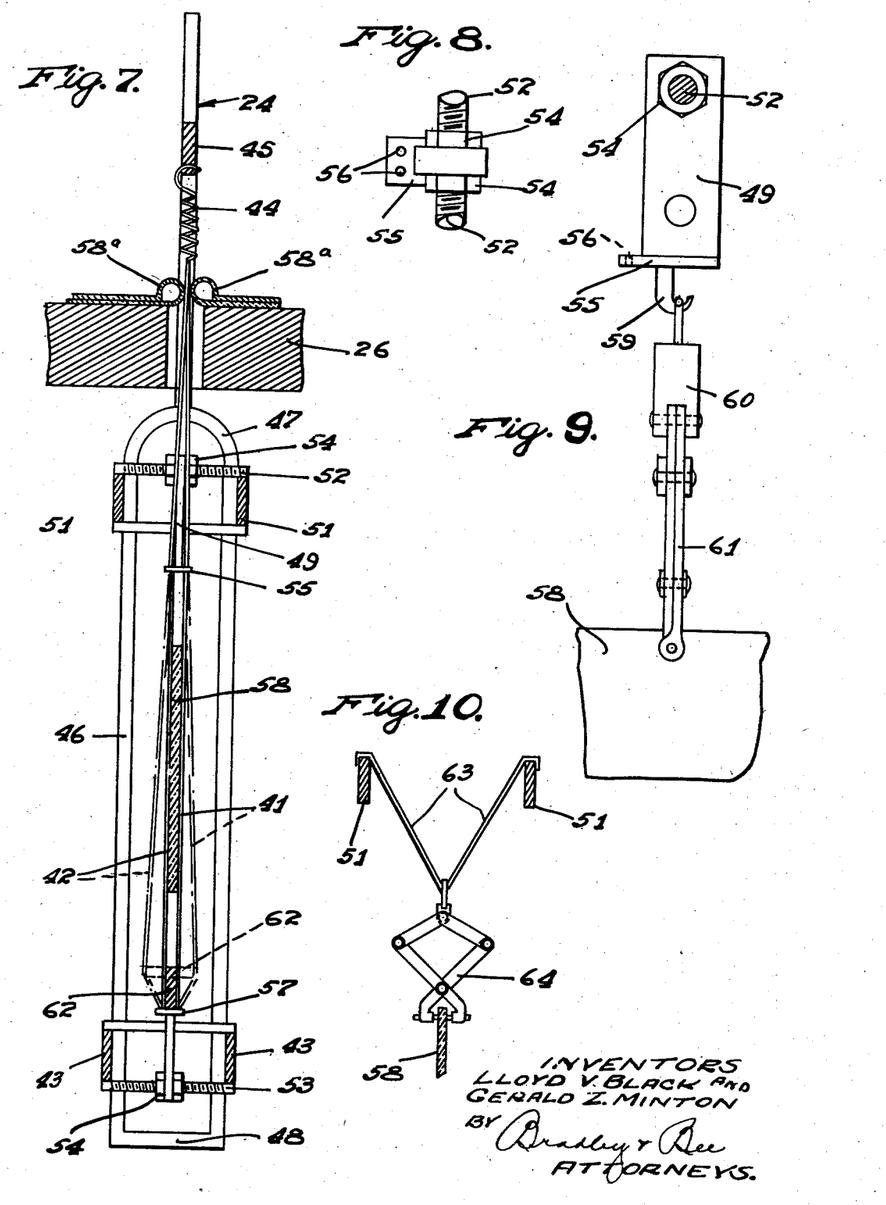
Fig. 7 is a vertical section through the structure of Fig. 6.
Figs. 8 and 9 are enlarged detail views of parts of the Fig. 6 construction, Fig. 8 being a plan view and Fig. 9 a side elevation.
Fig. 10 is a sectional view showing a modified means of supporting the glass sheet in the Fig. 6 construction.

In order to support the glass sheet 58, two of the brackets 49 may be utilized, as indicated in Figs. 6 and 9, such brackets being provided with hooks 59 which support the blocks 60 carrying the tongs 61, such tongs being similar in construction to those shown in Fig. 4. In order to facilitate the placing of the glass plate in position between the pairs of wires, a plate 62 is provided which rests at its lower edge on the tops of the brackets 50. This plate during the bending operation lies in a vertical plane, as indicated in Fig. 7, but when it is desired to separate the wires to facilitate the insertion of the glass sheet, the plate is turned so that it lies in a horizontal plane, as indicated in the dotted lines in Fig. 7, thus spreading the wires apart as indicated by these dotted lines.

It is also possible in the construction of Fig. 6 to support the glass plate 58 from the bars 51 by the provision of means, as indicated in Fig. 10, such means comprising hook members 63 which support the tongs 64. If the glass sheet is supported by this method, it becomes necessary to position the tongs in the same manner as described in connection with the structure of Figs. 1 to 5; that is, it is necessary that the tongs engage the glass sheet at the points at which it does not change its position during the bending operation.

Figure 11:
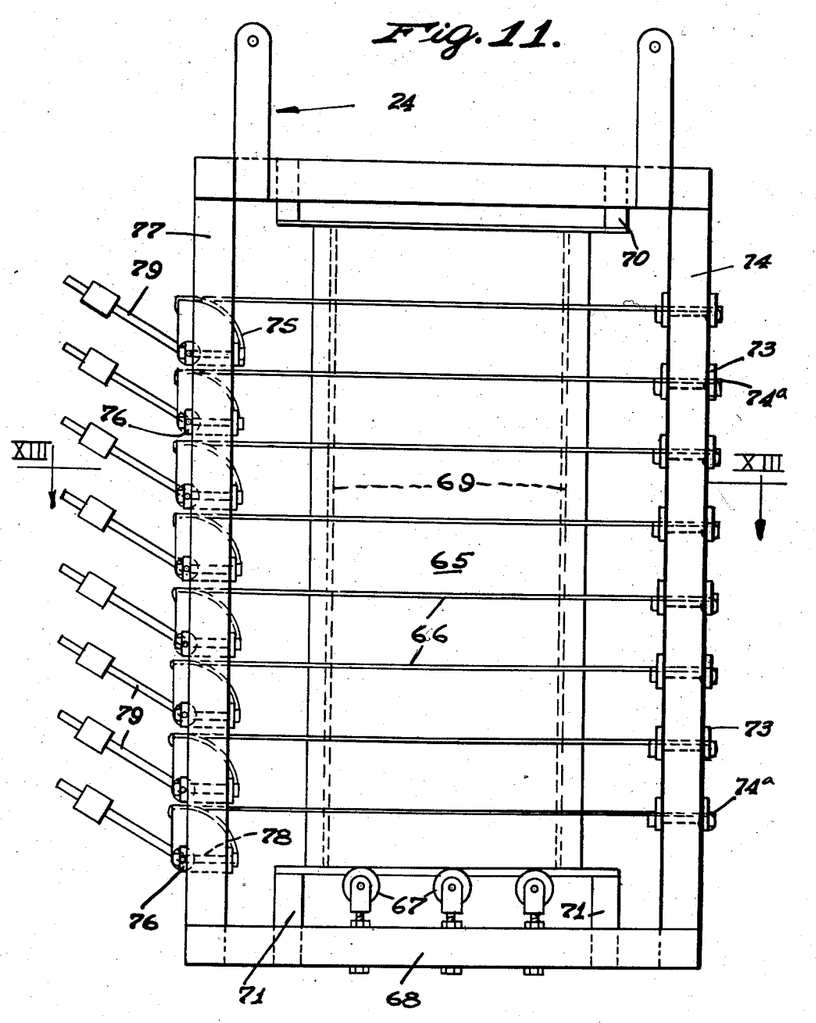
Fig. 11 is a side elevation of another modification.
Figure 12:
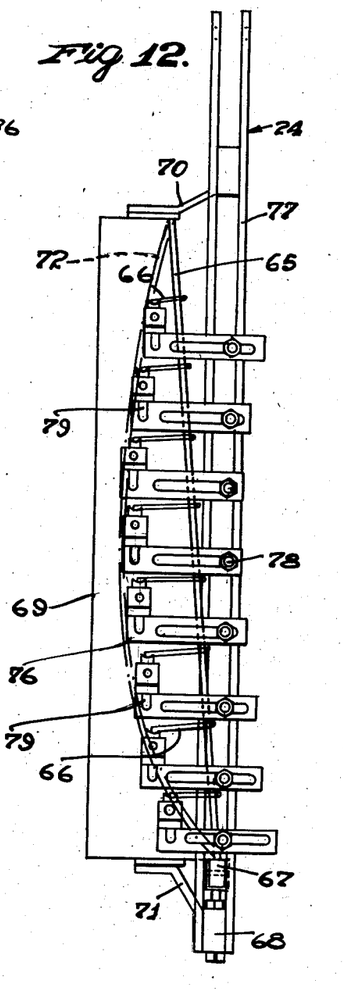
Fig. 12 is an edge elevation of the Fig. 11 construction.
Figure 13:
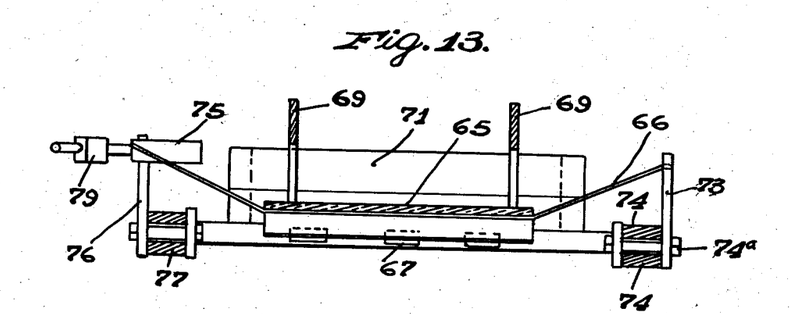
Fig. 13 is a horizontal section on the line XIII—XIII of Fig. 11.

In the construction of Figs. 11 to 13, templets are employed for governing the bending movement of the glass plate 65 and the bending operation is accomplished by means of the single set of wires 66 which are arranged horizontally, instead of vertically as in the constructions heretofore described. In this apparatus, the glass plate instead of being hung from its upper edge is supported at its lower edge upon the rollers 67 mounted on the bottom bar 68 of the frame, which support permits the sheet to move freely in its bending movement. Two vertical templet bars 69 are employed, such bars being secured to the frame at their upper and lower ends by the brackets 70 and 71 (Fig. 12). The curvature of the plate is determined by the curve of the front side of these templat plates, as indicated by the dotted lines 72 (Fig. 12). The wires 66 are attached at their right hand ends (Figs. 11 and 13) to the brackets 73 carried by the side frame member 74, such brackets all being provided with slots to permit of their adjustment, and are clamped by the bolts 74a. The other ends of the wires are attached to quadrant members 75 pivoted on the brackets 76 (Fig. 12), such brackets being slotted and secured to the side member 77 of the frame by means of the bolts 78, so that the position of the quadrant members may be adjusted for different curvatures to correspond to the adjustment of the brackets 73. The quadrants are provided with counterweighted arms 79 which tend to swing them in a counter-clockwise direction and thus tension the wires 66. When the glass plate reaches a bending temperature, the pressure of the wires thereon bends it to the curved shape indicated in dotted lines in Fig. 12, at which time, the movement of the plate is stopped by the templet plates 69, which thus positively determine or fix the curvature of the plate.

Figure 14:
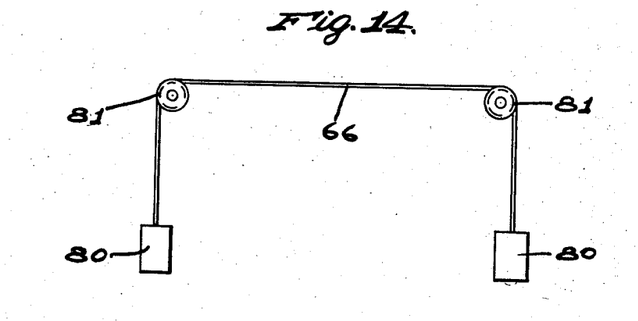
Fig. 14 is a side elevation illustrating a modification in detail of the Fig. 11 construction.

Fig. 14 illustrates a departure from the means of tensioning the wires 66 of the Fig. 11 construction in that each end of each wire 66 is provided with a weight 80 and passes over pulleys 81. These pulleys are mounted on slotted arms 82 (Fig. 15) so that the position of the wires may be adjusted to suit varying curvatures, as heretofore pointed out. The pulleys 81 are preferably mounted on swivel joints 83 so that the pulleys can adjust themselves to the angle of the wires 66.

Figures 16, 17:
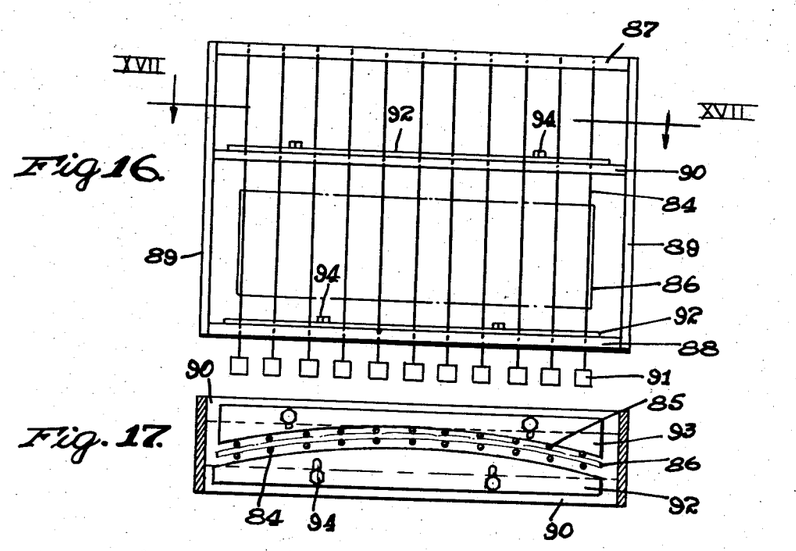
Fig. 16 is a diagrammatic front elevation of another modification.
Fig. 17 is a horizontal section on the line XVII—XVII of Fig. 16.

Figs. 16 and 17 illustrate diagrammatically a modification in which templets are employed for adjusting the position of the sets of wires 84 and 85 for bending the glass sheet 86. These wires are carried in a frame made up of the top and bottom bars 87 and 88, the side bars 89 and intermediate bar 90. The wires carry at their lower ends the tensioning weights 91 and may be adjusted to suit varying curvatures by means of the pairs of templets 92 and 93 which have their opposing edges of the desired contour, as indicated in Fig. 17. These templets are clamped in position by means of bolts 94 extending through slots in the templets to permit of adjustment. The bars 88 and 90 are made in pairs spaced apart to avoid contact with the wires. When it is desired to bend a sheet to a different curvature, all that is necessary is to substitute new templets 92 and 93 having their edges of the right curvature. No means are shown in this construction for supporting the glass sheet 86, but it will be understood that the sheet may be supported as heretofore described in connection with other forms of the device; also that springs may be used for tensioning the wires instead of the weights.

Figures 18, 19:
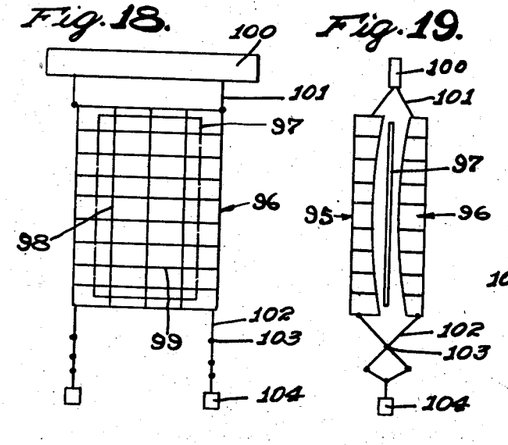
Figs. 18 and 19 show still another modification, Fig. 18 being a side elevation and Fig. 19 an edge elevation.

Figs. 18 and 19 illustrate diagrammatically another form of construction in which a pair of metallic grids 95 and 96 are employed for bending the sheet 97 to the desired curvature, the glass sheet in this case being hung from its upper edge by means similar to that heretofore described. The grids are formed of thin metal vertical strips 98 and transverse strips 99 suitably secured together at their intersections and supported from the bar 100 by means of the flexible members 101. The lower edges of the grids are moved yieldingly towards each other by any suitable means, such as the crossed levers 102 pivoted together at 103 and carrying the weights 104.

Figure 20:
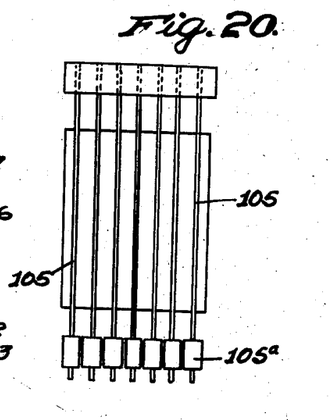
Fig. 20 is a front elevation of a modification of the structure of Figs. 18 and 19.

Fig. 20 illustrates another modification, in which the grid structure of Figs. 18 and 19 is replaced by the vertical bars 105 lying on each side of the glass sheet and supported in the same manner as the grids heretofore described. The lower ends of these bars may be pressed toward each other by the same means as that shown in Fig. 19, or may each merely carry a weight 105a. It will be understood that the vertical bars 105 are of relatively thin sheet metal and should have either a curvature similar to that of the grids 95 and 96, or should be hung on curved members at their upper ends so that they function like the wires of the Figs. 2 to 5 construction. In some cases the weight of the bars of Fig. 20 and the grids of Figs. 19 and 20 may be sufficient to give the necessary bending effect without the use of the weights at the lower ends thereof.

Figures 15, 21:
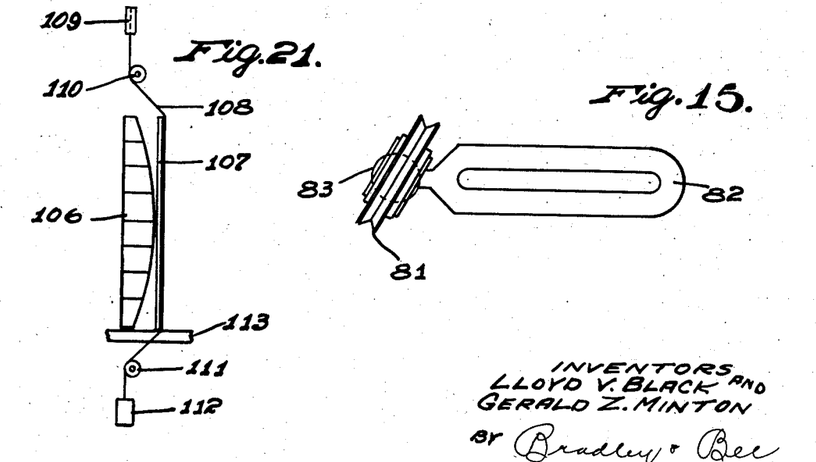
Fig. 15 is a side elevation of a detail of the Fig. 14 construction.
Fig. 21 is a diagrammatic side elevation showing another modification.

Fig. 21 illustrates diagrammatically still another bending arrangement, in which a fixed grid 106 lying on one side of the glass sheet 107 acts as a templet and the bending is accomplished by means of the single set of wires 108 secured at their upper ends to a bar 109 and passing around the guide pulleys 110 and 111, the lower end of each wire carrying a weight 112. In this case, the glass sheet is supported from beneath on bars 113 as in the construction of Fig. 11, instead of being suspended from its upper edge, anti-friction rolls being preferably employed upon such bar as heretofore described. This structure is the equivalent of that of Fig. 11 except that the wires are arranged vertically instead of horizontally. It will be understood that in all the various forms of construction, the springs for tensioning the wires may be substituted for the weights along the line of the disclosure of Fig. 6, the use of weights, however, being ordinarily preferred because they are not affected by the heat incident to the bending operation. When springs are used, they must necessarily lie outside of the furnace as is illustrated in Fig. 7.

The term "softening point," as used herein, refers to the point in temperature at which the glass loses its rigidity so that it may be bent, rather than to the point at which the surface becomes sensibly soft so that it will take an impression from the bending members. The temperature required varies somewhat with the glass composition, ranging around 1050 deg. F., and must be regulated within somewhat narrow limits.

What we claim is:

1. A method of bending a glass sheet which comprises supporting it in a vertical position in such relation as to be freely responsive to forces tending to bend it, applying over the area of the sheet on opposite sides thereof a plurality of light metallic members in spaced parallel relation, supporting the metallic members under tension in such manner that they tend to assume positions defining a curved zone and to exert pressure on the sheet preliminary to the heating thereof, and then heating the sheet to softening temperature so that said members bend it to the shape of said zone.

2. A method of bending a glass sheet which comprises supporting it in a vertical position in such relation as to be freely responsive to forces tending to bend it, applying over the area of the sheet on one side thereof a plurality of light metallic members in spaced parallel relation, supporting the metallic members under tension in such manner that they tend to assume positions defining a curved zone and to exert pressure on the sheet preliminary to the heating thereof and then heating the sheet to softening temperature so that said members bend it to the shape of said zone, while at the same time opposing on the sheet the forces exerted by the members to insure bendin action thereof.

3. A method of bending a glass sheet which comprises supporting it in a vertical position in such relation as to be freely responsive to forces tending to bend it, applying over the area of the sheet on one side thereof a plurality of light metallic members in spaced parallel relation, supporting the metallic members under tension in such manner that they tend to assume positions defining a curved zone and to exert pressure on the sheet preliminary to the heating thereof and then heating the sheet to softening temperature so that said members bend it to the shape of said zone, while at the same time opposing on the sheet the forces exerted by the members to insure bending action thereof, and positively resisting bending movement of the glass sheet on the side thereof opposite the application of said members when the sheet has been formed to the shape of the curved zone.

4. A method of bending a glass sheet which comprises supporting it along its lower edges and in a vertical position in such relation as to be freely responsive to the forces tending to bend it, applying over the area of the sheet on one side thereof a plurality of light metallic members in spaced parallel relation supporting the metallic members under tension in such manner that they tend to assume positions defining a curved zone and to exert pressure on the sheet preliminary to the heating thereof, and then heating the sheet to softening temperature so that said members bend it to the shape of said zone, while at the same time opposing on the sheet the forces exerted by the members to insure bending action thereof.

5. A method of bending a glass sheet which comprises suspending it along its upper edges in a vertical position in such relation as to be freely responsive to the forces tending to bend it, applying over the area of the sheet on one side thereof a plurality of light metallic members in spaced parallel relation, supporting the metallic members under tension in such manner that they tend to assume positions defining a curved zone and to exert pressure on the sheet preliminary to the heating thereof and then heating the sheet to softening temperature so that said members bend it to the shape of said zone, while at the same time opposing on the glass sheet the forces exerted by the members to insure bending action thereof.

6. A method of bending a glass sheet which comprises supporting it in a vertical position in such relation as to be freely responsive to forces tending to bend it, applying over the area of one side of the glass sheet a series of light metallic members normally positioned along a zone of predetermined curvature and adapted to be held out of said zone by the unbent glass sheet in its vertically supported position before said glass sheet responds to bending action, applying tensional forces to opposite extremities of the light metallic members tending to maintain them along the predetermined zone, holding the glass sheet in opposition to the bending forces of the light metallic members to prevent its displacement, and heating the glass sheet to softening temperature until it bends to the shape of said zone under the influence of the forces exerted by the light metallic members.

7. An apparatus for bending a glass sheet comprising means for supporting the sheet in vertical position in such relation as to be freely responsive to forces tending to bend it, two spaced series of light metallic members arranged to define between them a curved zone, means supporting the metallic members in such manner that the two series of said members may be displaced for insertion of said glass sheet between them, and means placing said metallic members under tension so that they tend, when displaced, to return to their original positions and thus reestablish said curved zone.

8. An apparatus for bending a glass sheet comprising means for supporting a sheet in vertical position in such relation as to be freely responsive to forces tending to bend it, a series of light metallic members arranged to define therealong a predetermined curved zone, backing means associated with said members and cooperating therewith along the boundaries of said curved zone to hold the glass sheet, means displaceably supporting the metallic members whereby the latter are movable to receive the glass sheet between the series of them and said backing means, tensioning means connected to the members and exerting forces tending to maintain members in their zone-defining relation and operative to return them to their original zone-defining position after they have been displaced therefrom.

9. An apparatus for bending a glass sheet comprising means for supporting a sheet in vertical position in such relation as to be freely responsive to forces tending to bend it, a series of light metallic members arranged to define therealong a predetermined curved zone, a templet located in opposed relation to said members and cooperating therewith along the boundaries of said curved zone to hold the glass sheet, means displaceably supporting the metallic members whereby the latter are movable to receive the glass sheet between the series of them and said templet, tensioning means connected to the members and exerting forces tending to maintain the metallic members in their zone-defining relation and operative to return them to their original zone-defining position after they have been displaced therefrom.

10. An apparatus for bending a glass sheet comprising means for supporting the sheet in a vertical position in such relation as to be freely responsive to forces tending to bend it, a series of wires arranged to define therealong a predetermined curved zone, backing means associated with said wires and cooperating therewith in establishing boundaries of the curved zone, means displaceably supporting the wires in such manner as to be laterally movable for insertion of said glass sheet between the series of them and said backing means, and tensioning means connected to the wires and exerting forces tending to maintain the wires in their curved zone-forming relation and operative to return them to their original zone-forming position after they have been displaced therefrom.

11. An apparatus for bending a glass sheet comprising means for supporting the sheet in a vertical position in such relation as to be free'y responsive to forces tending to bend it, two series of wires arranged to define therealong a predetermined curved zone, means displaceably supporting the wires in such manner as to be laterally movable for insertion of said glass sheet between the two series of them, and tensioning means connected to the wires and exerting forces tending to maintain the wires in their zone-forming relation and operative to return them to their original zone-forming position after they have been displaced therefrom.

12. An apparatus for bending a glass sheet comprising the means for supporting the sheet in a vertical position in such relation as to be freely responsive to forces tending to bend it, a series of light metallic members arranged to define therealong a predetermined curved zone, backing means cooperating with said members along the boundaries of the curved zone and movable laterally for receiving the glass sheet between said series of members and the backing means, means supporting the metallic members and backing means and including mechanism adjustable to vary the curvature of said zone, and tensioning means connected to said members and exerting forces tending to maintain the members in their curved zone-forming relation and operative to return them to their original zone-forming relation after they have been displaced therefrom.

13. An apparatus for bending a glass sheet comprising means for supporting the sheet in a vertical position in such relation as to be freely responsive to forces tending to bend it, a series of wires arranged to define therealong a predetermined curved zone, backing means associated with said wires and cooperating therewith along the boundaries of the curved zone to hold the glass sheet, means displaceably supporting the wires whereby the latter are laterally movable for insertion of said glass sheet between the series of them and said backing means, tensioning means connected to the wires and exerting forces tending to maintain the wires in their zone-forming relation and operative to return them to their original zone-forming position after they have been displaced therefrom, and means for heating the sheet to softening temperature while the sheet is associated with the wires whereby the wires respond to the tensioning means in bending the glass sheet.

14. An apparatus for bending a glass sheet comprising means for supporting the sheet in a vertical position in such relation as to be freely responsive to forces tending to bend it, a series of wires arranged to define therealong a predetermined curved zone, backing means associated with said wires and cooperating therewith along the boundaries of the curved zone to hold the glass sheet supporting the wires displaceably whereby the latter are laterally movable for insertion of said glass sheet between the series of them and said backing means, tensioning means connected to the wires and exerting forces tending to maintain the wires in their zone-forming relation and operative to return them to their original zone-forming position after they have been displaced therefrom, heating means, and means for carrying the glass sheet supported by said series of wires and backing means into the heating means.

LLOYD V. BLACK.
GERALD Z. MINTON.